(12) United States Patent
Fukuda

(10) Patent No.: US 6,208,599 B1
(45) Date of Patent: Mar. 27, 2001

(54) OPTICAL DISK APPARATUS

(75) Inventor: Misao Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/120,732

(22) Filed: Jul. 23, 1998

(30) Foreign Application Priority Data

Jul. 23, 1997 (JP) .................................................. 9-196265

(51) Int. Cl.$^7$ ..................................................... G11B 7/00
(52) U.S. Cl. ..................................... 369/53.36; 369/53.37
(58) Field of Search .................................. 369/32, 33, 34, 369/58, 54, 53

(56) References Cited

U.S. PATENT DOCUMENTS

| 5,734,631 | * | 3/1998 | Ikedo et al. | 369/32 |
| 5,761,160 | * | 6/1998 | Sanada | 369/32 |
| 5,859,817 | * | 1/1999 | Shimonou | 369/32 |

FOREIGN PATENT DOCUMENTS

| 3-102656 | 4/1991 | (JP) . |
| 6-314473 | 11/1994 | (JP) . |
| 7-37290 | 2/1995 | (JP) . |
| 8-31079 | 2/1996 | (JP) . |
| 9-102174 | 4/1997 | (JP) . |

* cited by examiner

Primary Examiner—Nabil Hindi
(74) Attorney, Agent, or Firm—Foley & Lardner

(57) ABSTRACT

An optical disk apparatus which has first and second light-emitting elements for emitting laser beams, and records data on a recording medium with laser beams from the first and second light-emitting elements includes first and second recording abnormality detectors, first and second protective circuits, and abnormality signal synchronization circuits. The first and second recording abnormality detectors detect abnormalities of recording by the first and second light-emitting elements from beams reflected by the recording medium during execution of recording. The first and second protective circuits immediately stop recording being executed by the first and second light-emitting elements, and protect data on the recording medium when the first and second recording abnormality detectors detect abnormalities. The abnormality signal synchronization circuits inform the second and first protective circuits of abnormalities in synchronism with completion of recording being executed by the second and first light-emitting elements when the first and second recording abnormality detectors detect the abnormalities.

16 Claims, 5 Drawing Sheets

FIG. 4A ERASE SECTOR
FIG. 4B ERASE ABNORMALITY DETECTION SIGNAL
FIG. 4C ERASE ABNORMALITY DETECTION SIGNAL
FIG. 4D ERASE LD EMISSION DATA
FIG. 4E ERASE LD EMISSION WAVEFORM
FIG. 4F RECORDING SECTOR
FIG. 4G SYNCHRONIZED ERASE ABNORMALITY DETECTION SIGNAL
FIG. 4H RECORDING DATA
FIG. 4I RECORDING LD EMISSION DATA
FIG. 4J RECORDING LD EMISSION WAVEFORM

OPTICAL DISK APPARATUS

BACKGROUND OF THE INVENTION

The present invention relates to an optical disk apparatus and, more particularly, to an optical disk apparatus capable of recording data on an optical disk medium using a plurality of laser beams.

In a conventional optical disk apparatus, data are recorded on an optical disk medium by irradiating the optical disk medium with a beam. In this case, data are recorded on the optical disk medium using changes in shape of those portions of the optical disk medium which are heated by irradiation of the optical disk medium with a beam, the direction of magnetic fields aligned under the influence of an external magnetic field when a high temperature decreases to room temperature, and changes in crystalline state caused by the temperature difference between a high temperature and room temperature.

In an optical disk apparatus of this type, when the servo becomes unstable during recording/erase of data on/from an optical disk medium, the recording/erase immediately stops in order to protect user data near portions where data are to be recorded/erased. Also, when an abnormal portion is detected on an optical disk medium, recording/erase immediately stops.

The above optical disk apparatus is constructed by a recording head 319 and an erase head 320, as shown in FIG. 5. The recording head 319 is constituted by a semiconductor laser 301, a laser driver 302, a protective circuit 303, a recording data generator 304, a photodetector 305, a medium reflection signal generator 306, a recording abnormality detector 307, a reproducing circuit 308, and an abnormal sector memory 309.

The erase head 320 is constituted by a semiconductor laser 310, a laser driver 311, a protective circuit 312, an erase data generator 313, a photodetector 314, a medium reflection signal generator 315, an erase abnormality detector 316, a reproducing circuit 317, and an abnormal sector memory 318.

When data are simultaneously recorded and erased with a plurality of heads, they are substantially simultaneously recorded by the recording head 319 and erased by the erase head 320 at the same portion of a recording medium 321 on the same track.

A signal obtained from the recording data generator 304 is transmitted to the laser driver 302 via the protective circuit 303. On the basis of the recording signal transmitted via the protective circuit 303, the laser driver 302 records data on the recording medium 321 using the semiconductor laser 301.

A signal obtained from the erase data generator 313 is transmitted to the laser driver 311 via the protective circuit 312. On the basis of the erase signal transmitted via the protective circuit 312, the laser driver 311 records erase data on the recording medium 321 using the semiconductor laser 310 to erase data from the recording medium 321.

In recording, a signal obtained via the photodetector 305 is converted into a medium reflection signal by the medium reflection signal generator 306. The medium reflection signal is transmitted to the recording abnormality detector 307. The recording abnormality detector 307 detects based on the medium reflection signal whether focusing control and tracking control fall within normal ranges, and the medium is free from any defect.

A recording abnormality detection signal detected by the recording abnormality detector 307 is transmitted to the protective circuit 303 and the abnormal sector memory 309, and in addition, to the protective circuit 312 and abnormal sector memory 318 of the erase head 320. Upon reception of the recording abnormality detection signal, the protective circuit 303 immediately stops transmission of recording data to the laser driver 302. In the abnormal sector memory 309, a sector detected to have a recording abnormality is stored on the basis of signals obtained from the reproducing circuit 308 and the recording abnormality detector 307.

In the erase head 320, the protective circuit 312 immediately stops transmission of erase data to the laser driver 311 upon reception of the recording abnormality detection signal. In the abnormal sector memory 318, a sector subjected to forcible stop due to the recording abnormality is stored on the basis of signals obtained from the reproducing circuit 317 and the recording abnormality detector 307. The abnormal recording sector and the abnormal erase sector obtained from the abnormal sector memories 309 and 318 are subjected to recording and erase retries or swapping of recording data on other sectors.

In erase, a signal obtained via the photodetector 314 is converted into a medium reflection signal by the medium reflection signal generator 315. The medium reflection signal is transmitted to the erase abnormality detector 316. The recording abnormality detector 316 detects based on the medium reflection signal whether focusing control and tracking control fall within normal ranges, and the medium is free from any defect.

An erase abnormality detection signal detected by the erase abnormality detector 316 is transmitted to the protective circuit 312 and the abnormal sector memory 318, and in addition, to the protective circuit 303 and abnormal sector memory 309 of the recording head 319. Upon reception of the erase abnormality detection signal, the protective circuit 312 immediately stops transmission of erase data to the laser driver 311. In the abnormal sector memory 318, a sector detected to have an erase abnormality is stored on the basis of signals obtained from the reproducing circuit 317 and the erase abnormality detector 316.

In the recording head 319, the protective circuit 303 immediately stops transmission of recording data to the laser driver 302 upon reception of the erase abnormality detection signal. In the abnormal sector memory 309, a sector subjected to forcible stop due to the erase abnormality is stored on the basis of signals obtained from the reproducing circuit 308 and the erase abnormality detector 316. The abnormal recording sector and the abnormal erase sector obtained from the abnormal sector memories 309 and 318 are subjected to recording and erase retries or swapping of recording data on other sectors.

In the conventional optical disk apparatus described above, if the recording abnormality detector 307 or the erase abnormality detector 316 detects an abnormality, the other circuit (erase head 320 or recording head 319) is also informed of this abnormality, and erase or recording in the other circuit is forcibly stopped.

For this reason, a sector, which may normally undergo recording or erase, is processed as an abnormal sector by an abnormal stop signal from one head. As a result, the recording and erase times of the optical disk apparatus are prolonged.

The above operation will be explained on the time axis shown in FIGS. 2A to 2D, 2G, and 2H. FIGS. 2A to 2D, 2G, and 2H show the case wherein the recording head 319 records data on recording sectors 200 "X, X+1, X+2, . . . ", and the recording head 320 erases data from erase sectors 203 "Y, Y+1, Y+2, . . . ", as shown in FIG. 2D.

When a recording abnormality occurs in the recording sector 200 "X+1" (FIG. 2A), and an abnormality signal 201 (FIG. 2B) is output upon detection of the recording abnormality, an abnormal recording stop signal 202 (FIG. 2C) is input to the protective circuit 303 to stop current recording. "X+1" is stored as an abnormal recording sector in the abnormal sector memory 309.

At the same time, on the erase head 320 side, the abnormal recording stop signal 202 (FIG. 2C) input to the protective circuit 312 immediately stops current erase. "Y+1" is stored as an abnormal erase sector in the abnormal sector memory 318. As for the erase sector, no recording abnormality occurs in the sector "Y+1", but only the abnormal recording stop signal 202 (FIG. 2C) is input from the recording head 319. Processing for the sector "Y+1", which may normally end, abnormally stops a time T1 before the end, and thus "Y+1" is recorded as an abnormal sector.

When an erase abnormality occurs in the erase sector 203 "Y+4" (FIG. 2D), and an abnormality signal 206 (FIG. 2G) is output upon detection of the erase abnormality, an abnormal erase stop signal 207 (FIG. 2H) is input to the protective circuit 312 to stop current erase. "Y+4" is stored as an abnormal erase sector in the abnormal sector memory 318.

At the same time, on the recording head 319 side, the abnormal erase stop signal 207 (FIG. 2H) input to the protective circuit 303 immediately stops current recording. "X+4" is stored as an abnormal recording sector in the abnormal sector memory 309. As for the recording sector, no erase abnormality occurs in the sector "X+4", but only the abnormal erase stop signal 207 is input from the erase head. Processing for the sector "X+4", which may normally end, abnormally stops a time T2 before the end, and thus "X+4" is recorded as an abnormal sector.

SUMMARY OF THE INVENTION

It is an object of the present invention to provide an optical disk apparatus capable of increasing the recording and erase speeds without performing abnormal sector processing for a sector which can normally undergo processing when recording or erase urgently stops.

In order to achieve the above object, according to the present invention, there is provided an optical disk apparatus which has first and second light-emitting elements for emitting laser beams, and records data on a recording medium with laser beams from the first and second light-emitting elements, comprising first and second abnormality detection means for detecting abnormalities of recording by the first and second light-emitting elements from beams reflected by the recording medium during execution of recording, first and second data protective means for immediately stopping recording being executed by the first and second light-emitting elements, and protecting data on the recording medium when the first and second abnormality detection means detect abnormalities, and abnormality signal synchronization means for informing the second and first data protective means of abnormalities in synchronism with completion of recording being executed by the second and first light-emitting elements when the first and second abnormality detection means detect the abnormalities.

DESCRIPTION OF THE PREFERRED EMBODIMENTS

The present invention will be described in detail below with reference to the accompanying drawings.

Figure 1:
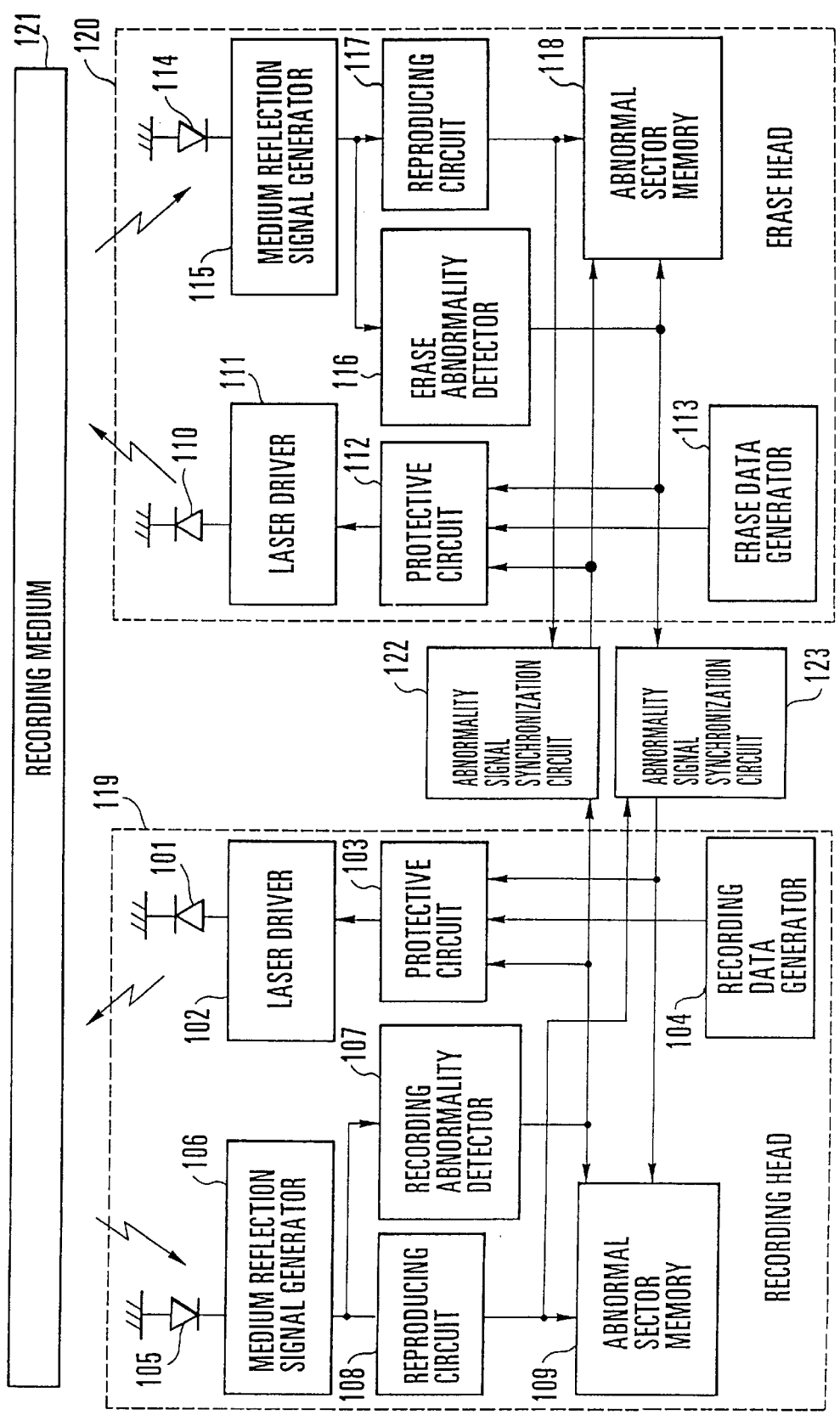
FIG. 1 is a block diagram showing the arrangement of an optical disk apparatus according to an embodiment of the present invention.
Figure 2:
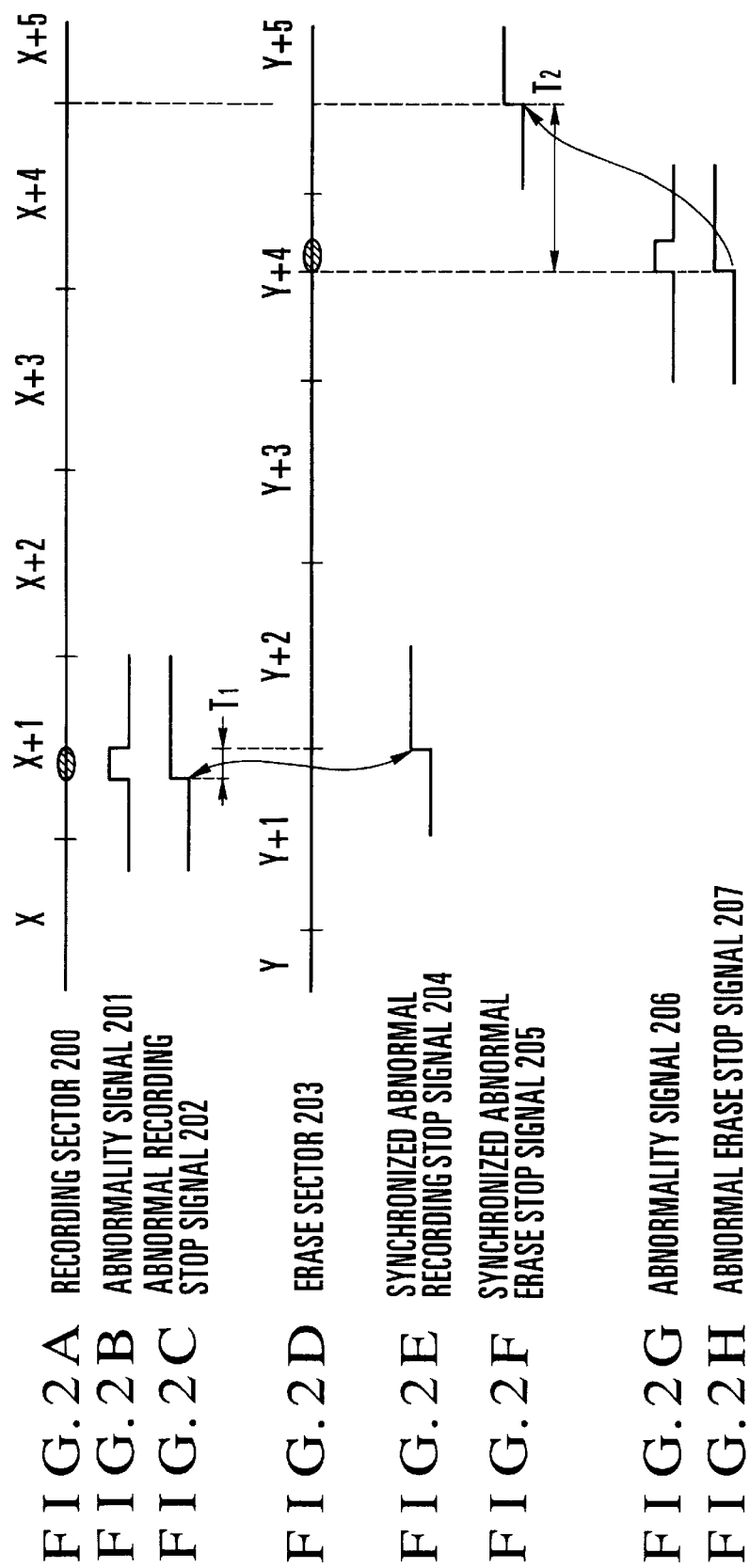
FIGS. 2A to 2H are timing charts showing the processing operation when a recording abnormality and an erase abnormality occur in the optical disk apparatus shown in FIG. 1.

FIG. 1 shows the arrangement of an optical disk apparatus according to an embodiment of the present invention. In FIG. 1, the optical disk apparatus according to an embodiment of the present invention is constituted by a recording head 119, an erase head 120, and abnormality signal synchronization circuits 122 and 123.

The recording head 119 is constituted by a semiconductor laser 101, a laser driver 102, a protective circuit 103, a recording data generator 104, a photodetector 105, a medium reflection signal generator 106, a recording abnormality detector 107, a reproducing circuit 108, and an abnormal sector memory 109.

The erase head 120 is constituted by a semiconductor laser 110, a laser driver 111, a protective circuit 112, an erase data generator 113, a photodetector 114, a medium reflection signal generator 115, an erase abnormality detector 116, a reproducing circuit 117, and an abnormal sector memory 118.

When data are simultaneously recorded and erased with a plurality of heads, they are substantially simultaneously recorded by the recording head 119 and erased by the erase head 120 at the same portion of a recording medium 121 on the same track.

A signal obtained from the recording data generator 104 is transmitted to the laser driver 102 via the protective circuit 103. On the basis of the recording signal transmitted via the protective circuit 103, the laser driver 102 records data on the recording medium 121 using the semiconductor laser 101.

A signal obtained from the erase data generator 113 is transmitted to the laser driver 111 via the protective circuit 112. On the basis of the erase signal transmitted via the protective circuit 112, the laser driver 111 records erase data on the recording medium 121 using the semiconductor laser 110 to erase data from the recording medium 121.

In recording, a signal obtained via the photodetector 105 is converted into a medium reflection signal by the medium reflection signal generator 106. The medium reflection signal is transmitted to the recording abnormality detector 107. The recording abnormality detector 107 detects based on the medium reflection signal whether focusing control and tracking control fall within normal ranges, and the medium is free from any defect. That is, a recording abnormality is detected using the medium reflection signal used for focusing control, tracking control, and data reproduction.

A recording abnormality detection signal detected by the recording abnormality detector 107 is transmitted to the protective circuit 103, the abnormal sector memory 109, and the abnormality signal synchronization circuit 122. Upon reception of the recording abnormality detection signal, the protective circuit 103 immediately stops transmission of recording data to the laser driver 102. In the abnormal sector memory 109, a sector detected to have a recording abnormality is stored on the basis of signals obtained from the reproducing circuit 108 and the recording abnormality detector 107.

When a synchronized recording abnormality detection signal is transmitted from the recording head 119 to the erase head 120 via the abnormality signal synchronization circuit 122, the protective circuit 112 immediately stops transmission of erase data to the laser driver 111. At this time, when the recording abnormality detection signal is transmitted from the recording head 119, the abnormality signal synchronization circuit 122 holds transmission of the synchronized recording abnormality detection signal to the protective circuit 112 on the basis of a signal from the reproducing circuit 117 of the erase head 120 until completion of current processing (erase) is detected. Upon detecting completion of the current processing, the abnormality signal synchronization circuit 122 transmits the synchronized recording abnormality detection signal to the protective circuit 112.

In the abnormal sector memory 118, a sector subjected to forcible stop due to the recording abnormality is stored on the basis of signals obtained from the reproducing circuit 117 and the abnormality signal synchronization circuit 122. The abnormal recording sector and the abnormal erase sector obtained from the abnormal sector memories 109 and 118 are subjected to recording and erase retries or swapping of recording data on other sectors.

In erase, a signal obtained via the photodetector 114 is converted into a medium reflection signal by the medium reflection signal generator 115. The medium reflection signal is transmitted to the erase abnormality detector 116. The recording abnormality detector 116 detects based on the medium reflection signal whether focusing control and tracking control fall within normal ranges, and the medium is free from any defect. In other words, an erase abnormality is detected using the medium reflection signal used for focusing control, tracking control, and data reproduction.

An erase abnormality detection signal detected by the erase abnormality detector 116 is transmitted to the protective circuit 112, the abnormal sector memory 118, and the abnormality signal synchronization circuit 123. Upon reception of the erase abnormality detection signal, the protective circuit 112 immediately stops transmission of erase data to the laser driver 111. In the abnormal sector memory 118, a sector detected to have an erase abnormality is stored on the basis of signals obtained from the reproducing circuit 117 and the erase abnormality detector 116.

When a synchronized erase abnormality detection signal is transmitted to the recording head 119 from the erase head 120 via the abnormality signal synchronization circuit 123, the protective circuit 103 immediately stops transmission of recording data to the laser driver 102. At this time, when the erase abnormality detection signal is transmitted from the recording head 120, the abnormality signal synchronization circuit 123 holds transmission of the synchronized erase abnormality detection signal to the protective circuit 103 on the basis of a signal from the reproducing circuit 108 of the erase head 119 until completion of current processing (recording) is detected. Upon detecting completion of the current processing, the abnormality signal synchronization circuit 123 transmits the synchronized erase abnormality detection signal to the protective circuit 103.

In the abnormal sector memory 109, a sector subjected to forcible stop due to the erase abnormality is stored on the basis of signals obtained from the reproducing circuit 108 and the abnormality signal synchronization circuit 123. The abnormal recording sector and the abnormal erase sector obtained from the abnormal sector memories 109 and 118 are subjected to recording and erase retries or swapping of recording data on other sectors.

FIGS. 2A to 2H show the processing operation when a recording abnormality and an erase abnormality occur in the optical disk apparatus shown in FIG. 1.

FIGS. 2A to 2H show the case wherein the recording head records data on recording sectors 200 "X, X+1, X+2, . . . ", and the erase head erases data from erase sectors 203 "Y, Y+1, Y+2, . . . ".

When a recording abnormality occurs in the recording sector 200 "X+1" (FIG. 2A), and an abnormality signal 201 (FIG. 2B) is output upon detection of the recording abnormality, an abnormal recording stop signal 202 (FIG. 2C) is input to the protective circuit 103 to stop current recording. "X+1" is stored as an abnormal recording sector in the abnormal sector memory 109.

When the abnormality signal synchronization circuit 122 receives the abnormal recording stop signal 202 (FIG. 2C), it generates a synchronized abnormal recording stop signal 204 (FIG. 2E) based on a signal obtained from the reproducing circuit 117 of the erase head 120. Based on the signal from the reproducing circuit 117, the abnormality signal synchronization circuit 122 holds transmission of the synchronized recording abnormality detection signal 204 (FIG. 2E) to the protective circuit 112 until completion of current processing (erase) is detected. Upon detecting completion of the current processing, the synchronized recording abnormality detection signal 204 (FIG. 2E) is transmitted to the protective circuit 112.

On the erase head 120 side, the synchronized abnormal recording stop signal 204 (FIG. 2E) input to the protective circuit 112 stops erase. That is, erase stops upon completion of processing for the sector "Y+1". "Y+2" is stored as an abnormal erase sector in the abnormal sector memory 118. The abnormal recording sector "X+1" and the abnormal erase sector "Y+2" obtained from the abnormal sector memories 109 and 118 are subjected to recording and erase retries or swapping of recording data on other sectors.

When an erase abnormality occurs in the erase sector 303 "Y+4", and an abnormality signal 206 (FIG. 2G) is output upon detection of the erase abnormality, an abnormal erase stop signal 207 (FIG. 2H) is input to the protective circuit 112 to stop current erase. "Y+4" is stored as an abnormal erase sector in the abnormal sector memory 118.

When the abnormality signal synchronization circuit 123 receives the abnormal erase stop signal 207 (FIG. 2H), it generates a synchronized abnormal erase stop signal 205 (FIG. 2F) based on a signal obtained from the reproducing circuit 108 of the recording head 119. Based on the signal from the reproducing circuit 108, the abnormality signal synchronization circuit 123 holds transmission of the synchronized erase abnormality detection signal 205 (FIG. 2F) to the protective circuit 103 until completion of current processing (recording) is detected. Upon detecting completion of the current processing, the synchronized erase abnormality detection signal 205 (FIG. 2F) is transmitted to the protective circuit 103.

On the recording head 119 side, the synchronized abnormal erase stop signal 205 (FIG. 2F) input to the protective circuit 103 stops recording. That is, recording stops upon completion of processing for the sector "X+4". "X+5" is stored as an abnormal recording sector in the abnormal sector memory 109. The abnormal recording sector "X+5"

and the abnormal erase sector "Y+4" obtained from the abnormal sector memories 109 and 118 are subjected to recording and erase retries or swapping of recording data on other sectors.

Since an urgent stop signal between the recording and erase heads 119 and 120 is synchronized with the end timing of current processing for a sector, processing for the sector, which abnormally stops in a conventional apparatus, can normally end. Accordingly, the recording and erase speeds with respect to the recording medium 121 increase.

FIGS. 3A to 3J show the detailed operations of the respective blocks upon occurrence of a recording abnormality.

Figure 3:
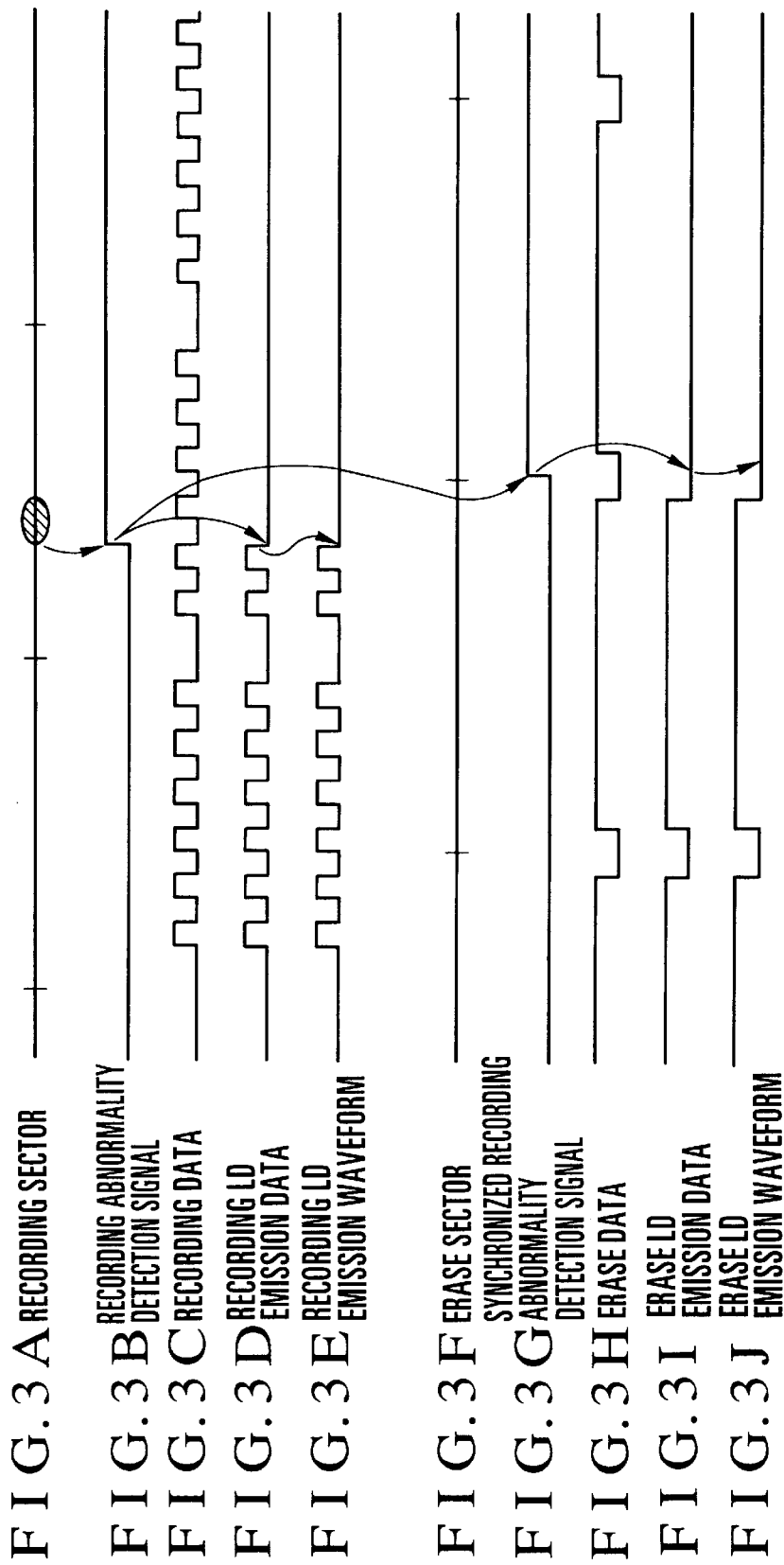
FIGS. 3A to 3J are timing charts showing the detailed operations of respective blocks when a recording abnormality occurs in the optical disk apparatus shown in FIG. 1.

In the recording head 119 during recording, the recording data generator 104 transmits recording data to the laser driver 102 via the protective circuit 103 (FIG. 3C). When the recording abnormality detector 107 detects a recording abnormality on a recording sector (FIG. 3A), it outputs a recording abnormality detection signal to the protective circuit 103 and the abnormality signal synchronization circuit 122 (FIG. 3B). Immediately after receiving the recording abnormality detection signal, the protective circuit 103 stops outputting recording data from the recording data generator 104 to the laser driver 102. Then, the laser driver 102 stops outputting recording LD emission data (FIG. 3D), and the semiconductor laser 101 stops emitting light (FIG. 3E).

Upon reception of the recording abnormality signal, the abnormality signal synchronization circuit 122 waits outputting the recording abnormality signal to the erase head 120, and monitors completion of processing for an erase sector. When the abnormality signal synchronization circuit 122 detects completion of processing for the erase sector (FIG. 3F), it outputs the recording abnormality signal as a synchronized recording abnormality detection signal to the protective circuit 112 of the erase head 120 (FIG. 3G).

In recording, the erase data generator 113 periodically outputs erase data to the laser driver 111 via the protective circuit 112 in synchronism with the start of an erase sector (FIG. 3H). Upon reception of the synchronized recording abnormality detection signal, the protective circuit 112 stops outputting erase data from the erase data generator 113 to the laser driver 111. Then, the laser driver 111 stops outputting erase LD emission data (FIG. 3I), and the semiconductor laser 110 stops emitting light (FIG. 3J).

FIGS. 4A to 4J show the detailed operations of the respective blocks upon occurrence of an erase abnormality.

Figure 4:
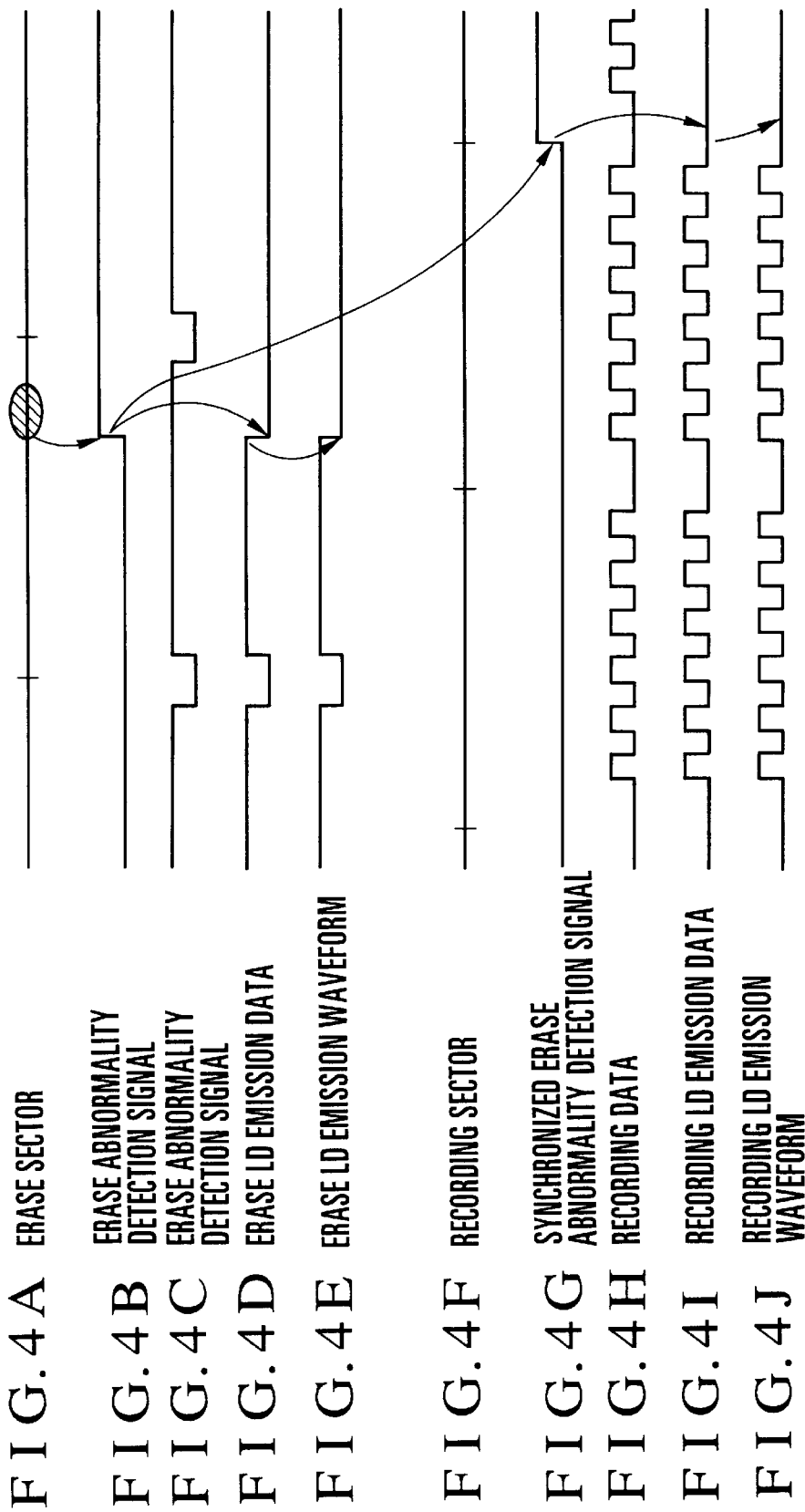
FIGS. 4A to 4J are timing charts showing the detailed operations of the respective blocks when an erase abnormality occurs in the optical disk apparatus shown in FIG. 1.
Figure 5:
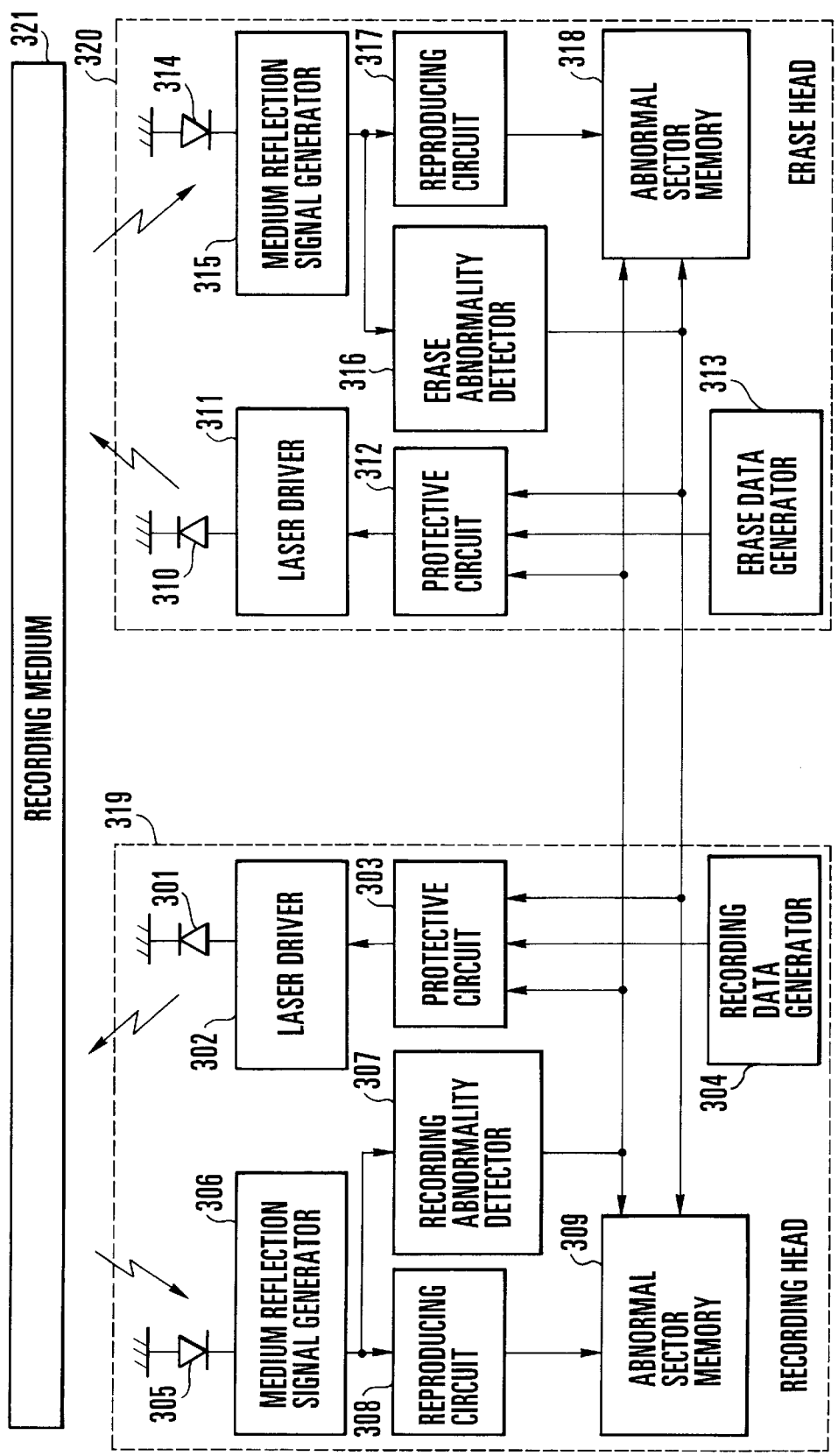
FIG. 5 is a block diagram showing the arrangement of a conventional optical disk apparatus.

In the erase head 120 during erase, the erase data generator 113 periodically transmits erase data to the laser driver 111 via the protective circuit 112 in synchronism with the start of an erase sector (FIG. 4C). When the erase abnormality detector 116 detects an erase abnormality on an erase sector (FIG. 4A), it outputs an erase abnormality detection signal to the protective circuit 112 and the abnormality signal synchronization circuit 123 (FIG. 4B). Immediately after receiving the erase abnormality detection signal, the protective circuit 112 stops outputting erase data from the erase data generator 113 to the laser driver 111. Then, the laser driver 111 stops outputting erase LD emission data (FIG. 4D), and the semiconductor laser 110 stops emitting light (FIG. 4E).

Upon reception of the erase abnormality signal, the abnormality signal synchronization circuit 123 waits outputting the erase abnormality signal to the recording head 119, and monitors completion of processing for a recording sector. When the abnormality signal synchronization circuit 123 detects completion of processing for the recording sector (FIG. 4F), it outputs the erase abnormality signal as a synchronized erase abnormality detection signal to the protective circuit 103 of the recording head 119 (FIG. 4G).

In recording, the recording data generator 104 periodically outputs recording data to the laser driver 102 via the protective circuit 103 (FIG. 4H). Upon reception of the synchronized erase abnormality detection signal, the protective circuit 103 stops outputting recording data from the recording data generator 104 to the laser driver 102. Then, the laser driver 102 stops outputting recording LD emission data (FIG. 4I), and the semiconductor laser 101 stops emitting light (FIG. 4J).

In the above embodiment, the optical disk apparatus comprises the two abnormality signal synchronization circuits 122 and 123, but may be constituted by one circuit. The abnormality signal synchronization circuits 122 and 123 are arranged outside the recording and erase heads 119 and 120, but may be respectively incorporated in the erase and recording heads 120 and 119.

The recording and erase abnormality detectors 107 and 116 detect recording abnormalities with medium reflection signals used for focusing control, tracking control, and data reproduction. However, recording abnormalities may be detected with a medium reflection signal used for one of them.

As has been described above, according to the present invention, when an abnormality is detected in the second circuit, the first head is informed of the abnormality in the second circuit in synchronism with completion of current recording, and abnormal sector processing is performed after completion of processing for a normal sector. As a result, the recording and erase speeds increase without abnormally processing a normal sector.

What is claimed is:

1. An optical disk apparatus which has first and second light-emitting elements for emitting laser beams, and records data on a recording medium with laser beams from the first and second light-emitting elements, comprising:

first and second abnormality detection means for detecting abnormalities of recording by the first and second light-emitting elements from beams reflected by the recording medium during execution of recording;

first and second data protective means for immediately stopping recording being executed by the first and second light-emitting elements, and protecting data on the recording medium when said first and second abnormality detection means detect abnormalities; and abnormality signal synchronization means for informing said second and first data protective means of abnormalities in synchronism with completion of recording being executed by the second and first light-emitting elements when said first and second abnormality detection means detect the abnormalities.

2. An apparatus according to claim 1, wherein the first and second light-emitting elements perform recording in units of sectors, said first and second abnormality detection means detect abnormal sectors during recording, said first and second data protective means stop recording midway along sectors, and said abnormality signal synchronization means informs said second and first data protective means of abnormalities in synchronism with completion of recording being executed by the second and first light-emitting elements in units of sectors when said first and second abnormality detection means detect the abnormalities.

3. An apparatus according to claim 2, further comprising first and second abnormal sector memory means for storing abnormal sectors when said first and second abnormality detection means detect sector abnormalities, and storing, as abnormal sectors, sectors subsequent to sectors subjected to recording being executed by the first and second light-emitting elements when abnormalities are informed from said abnormality signal synchronization means.

4. An apparatus according to claim 1, wherein said abnormality signal synchronization means informs said second and first data protective means of abnormalities detected by said first and second abnormality detection means on the basis of timings of recording by the first and second light-emitting elements.

5. An apparatus according to claim 1, wherein said first and second abnormality detection means respectively detect abnormalities of recording by the first and second light-emitting elements by using a signal used for focusing control of the recording medium.

6. An apparatus according to claim 1, wherein said first and second abnormality detection means respectively detect abnormalities of recording by the first and second light-emitting elements by using a signal used for tracking control of the recording medium.

7. An apparatus according to claim 1, wherein said first and second abnormality detection means respectively detect abnormalities of recording by the first and second light-emitting elements by using a signal used for reproducing data of the recording medium.

8. An optical disk apparatus comprising a recording head which has a first light-emitting element for emitting a laser beam and records data on a recording medium with a laser beam from the first light-emitting element, and an erase head which has a second light-emitting element for emitting a laser beam and records data on the recording medium with a laser beam from the second light-emitting element,
    said recording head having
        first abnormality detection means for detecting an abnormality of recording by the first light-emitting element from a beam reflected by the recording medium during execution of recording,
        first data protective means for stopping recording being executed by the first light-emitting element, and protecting data on the recording medium when said first abnormality detection means detects an abnormality, and
        first abnormality informing means for informing said first data protective means of an abnormality in synchronism with completion of recording being executed by the first light-emitting element when the abnormality is detected in said erase head; and
    said erase head having
        second abnormality detection means for detecting an abnormality of erase by the second light-emitting element from a beam reflected by the recording medium during execution of erase,
        second data protective means for stopping erase being executed by the second light-emitting element, and protecting data on the recording medium when said second erase abnormality detection means detects an abnormality, and
        second abnormality informing means for informing said second data protective means of an abnormality in synchronism with completion of erase being executed by the second light-emitting element when the abnormality is detected in said recording head.

9. An apparatus according to claim 8, wherein the first and second light-emitting elements perform recording and erase in units of sectors,
    said first and second abnormality detection means detect abnormal sectors during recording and erase,
    said first and second data protective means stop recording and erase midway along sectors, and
    said first and second abnormality informing means inform said first and second data protective means of abnormalities in synchronism with completion of recording being executed by the first and second light-emitting elements in units of sectors when said second and first abnormality detection means detect the abnormalities.

10. An apparatus according to claim 9, wherein said recording head comprises first abnormal sector memory means for storing an abnormal sector when said first abnormality detection means detects a sector abnormality, and storing, as an abnormal sector, a sector subsequent to a sector subjected to recording being executed by the first light-emitting element when an abnormality is detected in said erase head, and
    said erase head comprises second abnormal sector memory means for storing an abnormal sector when said second abnormality detection means detects a sector abnormality, and storing, as an abnormal sector, a sector subsequent to a sector subjected to erase being executed by the second light-emitting element when an abnormality is detected in said recording head.

11. An apparatus according to claim 8, wherein said first abnormality informing means informs said first data protective means of an abnormality detected in said erase head on the basis of a timing of recording by the first light-emitting element, and
    said second abnormality informing means informs said second data protective means of an abnormality detected in said recording head on the basis of a timing of erase by the second light-emitting element.

12. An apparatus according to claim 8, wherein said first and second abnormality detection means respectively detect recording and erase abnormalities with a signal used for focusing control of the recording medium.

13. An apparatus according to claim 8, wherein said first and second abnormality detection means respectively detect recording and erase abnormalities with a signal used for tracking control of the recording medium.

14. An apparatus according to claim 8, wherein said first and second abnormality detection means respectively detect recording and erase abnormalities with a signal used for reproducing data of the recording medium.

15. An optical disk apparatus, comprising:
    (a) a recording head comprising:
        a first abnormality detector circuit which detects recording abnormalities on the optical disk;
        a first reproducing circuit,
        a first light emitting element which records data on the optical disk;
        a first protective circuit which stops recording of data upon receiving a signal from the first abnormality detector circuit;
    (b) an erase head comprising:
        a second abnormality detector circuit which detects erase abnormalities on the optical disk;

a second reproducing circuit;

a second light emitting element which erases data on the optical disk;

a second protective circuit which stops erasing of data upon receiving a signal from the second abnormality detector circuit; and (c) at least one abnormality signal synchronization circuit which transmits a signal from the first abnormality detector circuit to the second protective circuit after a signal from the second reproducing circuit indicates completion of the current erasing of data, and which transmits a signal from the second abnormality detector circuit to the first protective circuit after a signal from the first reproducing circuit indicates completion of the current recording of data.

16. The apparatus of claim 15, wherein:

the current recording of data comprises recording of data in a first sector on the optical disk; and the current erasing of data comprises erasing of data in a second sector on the optical disk.

\* \* \* \* \*